Dec. 24, 1957  A. J. HESMER  2,817,489
BUTTERFLY VALVE WITH FLOW PROPORTIONAL TO VALVE ROTATION
Filed Jan. 25, 1954  2 Sheets-Sheet 1

Inventor:
Albert J. Hesmer
By: Schroeder, Hofmen,
Brady & Wegner
Attorneys

Dec. 24, 1957 A. J. HESMER 2,817,489
BUTTERFLY VALVE WITH FLOW PROPORTIONAL TO VALVE ROTATION
Filed Jan. 25, 1954 2 Sheets-Sheet 2

Inventor:
Albert J. Hesmer
By Schrader, Hofgren,
Brady & Wegner
Attorneys

United States Patent Office 2,817,489
Patented Dec. 24, 1957

2,817,489

BUTTERFLY VALVE WITH FLOW PROPORTIONAL TO VALVE ROTATION

Albert J. Hesmer, Marshalltown, Iowa, assignor, by mesne assignments, to Dunham-Bush, Inc., West Hartford, Conn., a corporation of Connecticut Application January 25, 1954, Serial No. 405,732

8 Claims. (Cl. 251—208)

This invention relates to an improved fluid valve, and in particular it relates to a butterfly type valve in which the area of the valve opening varies generally in proportion to the angular movement of the valve member.

It is desirable in valves for use on hot water heating systems, and cooling systems using chilled liquid, to so construct the valve that the volume of liquid which may flow through the valve at various positions of the valve handle varies more or less in proportion to the degree of angular movement of the valve handle from closed position. This is helpful either in manual operation of the valve or where the valve is power operated under thermostatic control.

The principal object of the present invention, therefore, is to provide a circulation valve of the butterfly type in which the percentage of flow through the valve varies more nearly in proportion to handle movement than is possible with previous types of butterfly valves.

A further object of the invention is to provide a butterfly valve which is of simple and rugged construction.

The invention is illustrated in a preferred embodiment in the accompanying drawings in which.

Figure 1:
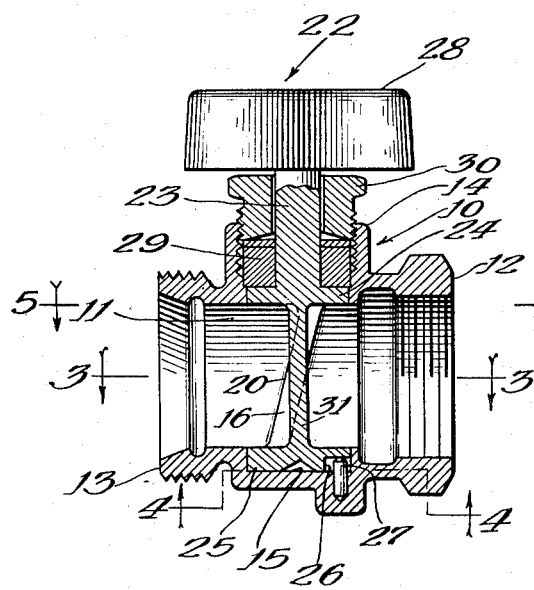
Fig. 1 is a central vertical sectional view through a valve constructed in accordance with the invention.

Referring to the drawings in greater detail, and referring first to Fig. 1, a valve body, indicated generally at 10, is provided with a chamber 11 on opposite sides of which are inlet and outlet bosses 12 and 13, respectively, which are threaded for connection to the pipes of a liquid circulating system. Above the valve chamber 11 is an annular boss 14, and in the bottom of the valve chamber in alignment with said boss is a circular recess 15.

Figure 2:
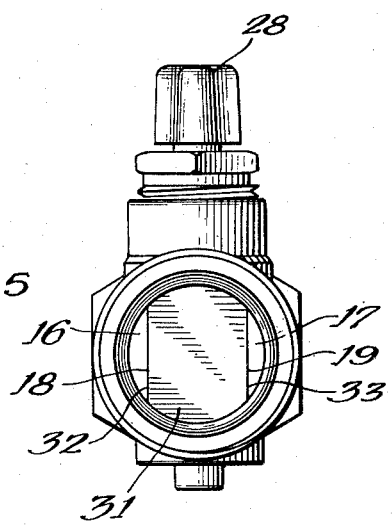
Fig. 2 is an end elevational view of the valve.
Figure 3:
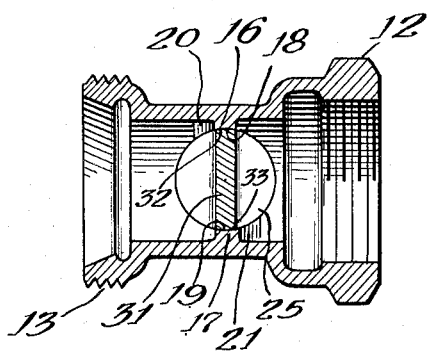
Fig. 3 is a section taken as indicated along the line 3—3 of Fig. 1.

At opposite sides of the valve chamber 11 are inwardly extending ribs 16 and 17 which, as best seen in Figs. 2 and 3, have concave facing margins 18 and 19, respectively, which are opposed portions of a cylinder and faces 20 and 21, respectively, which are inclined at an angle of about 76° to the longitudinal axis of the valve chamber 11.

Figure 4:
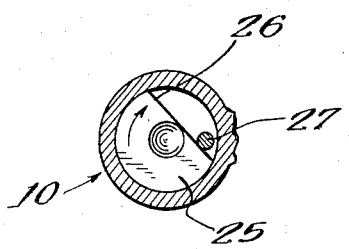
Fig. 4 is a section taken as indicated along the line 4—4 of Fig. 1.
Figure 5:
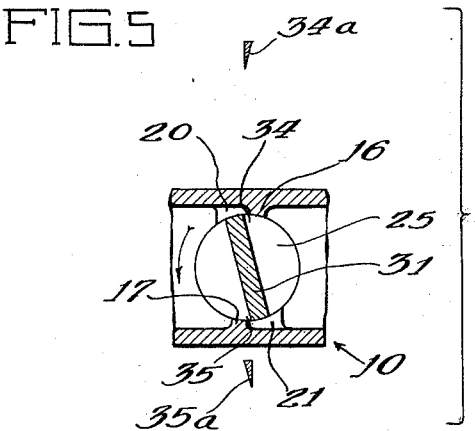
Figs. 5 to 9 are diagrammatic views of the valve at various positions of the butterfly valve member, taken substantially as indicated along the line 5—5 of Fig. 1, each view showing the area of the triangular openings in the valve at the particular valve setting.
Figure 6:
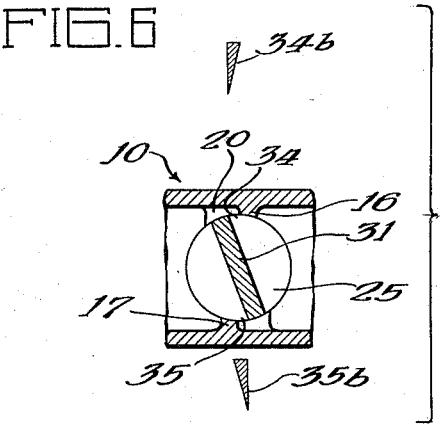
Figure 7:
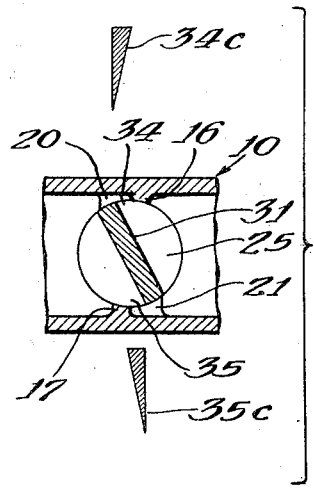
Figure 8:
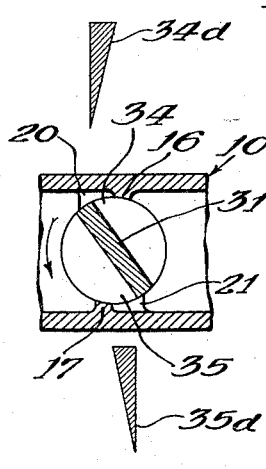
Figure 9:
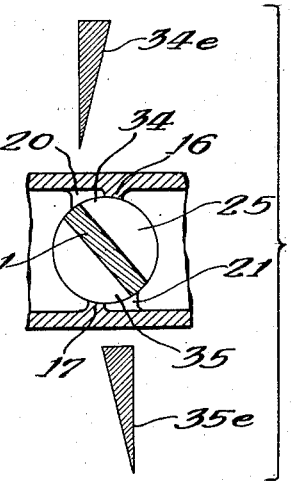

Mounted in the valve body 10 is a butterfly valve assembly, indicated generally at 22, including a valve stem 23 which is centrally positioned in the annular boss 14 and has circular top and bottom guide skirts 24 and 25, respectively, which make snug rotating fits in the boss 14 and in the circular recess 15, respectively. As best seen in Figs. 1 and 4, the circular skirt 25 is provided with a shoulder 26 which cooperates with a pin 27 in the recess 15 to limit movement of the valve assembly in both directions, and a handle 28 on the top of the valve stem 23 permits easy manipulation of the valve assembly. A packing 29, surmounted by a packing gland 30 which is screwed into the top of the boss 14, prevents leakage of liquid around the valve stem.

Mounted upon the valve stem 23 between the guide skirts 24 and 25 is a butterfly valve member 31 which, as seen in Figs. 2 and 3, has parallel marginal portions 32 and 33 which are complementary to the parallel facing margins 18 and 19 of the ribs 16 and 17, so that they are arcs of a cylinder having a center common with that of which said margins 18 and 19 are portions, said center being at the axis of rotation of valve stem 23. Thus, when the butterfly valve member 31 is in the closed position illustrated in Figs. 1 to 3, its margins 32 and 33 fit the complementary margins 18 and 19, respectively, so closely that there is almost no leakage through the valve. Inasmuch as a perfect seal is not required in circulation systems of the type in which such valves are employed, the closure here disclosed is perfectly satisfactory, and the complementary surfaces 18 and 32 and 19 and 33 permit much less leakage through the valve than conventional butterfly type valves. As Fig. 1 shows, the upper end portion of surface 32 overlaps one marginal portion of surface 18, while the lower end overlaps the opposite marginal portion; and obviously the same must be true of surfaces 19 and 33.

Referring now to Figs. 5 to 9, the diagrammatic views illustrate the butterfly valve member 31 at various positions between the fully closed position of Figs. 1 to 3 and a fully open position. As shown in said views, the oppositely inclined faces 20 and 21 of the ribs 16 and 17 each forms a wall of one of the liquid flow passages 34 and 35 which are formed around the margins of the valve member 31 as the valve member is rotated from closed position. The triangles, or wedges, designated as 34a–e and 35a–e in Figs. 5–9, respectively, show a cross section of the passages 34 and 35 corresponding to each of the positions of the valve member 31 shown in Figs. 5 to 9. It is readily apparent that the triangles at all positions of the valve member 31 are similar triangles, so that the total flow passage at any given valve setting is a rectangle the area of which is equal to the area of the two triangles, and that this area varies generally in proportion to the angular movement of the valve member 31 from closed position.

The foregoing detailed description is given for clearness of understanding only, and no unnecessary limitations should be understood therefrom as some modifications will be obvious to those skilled in the art.

I claim:

1. A fluid valve comprising: a hollow body having a valve chamber adapted to be connected to inlet and outlet pipes; a pair of opposed, transverse ribs at the sides of said valve chamber, said ribs having concave facing margins which are opposed portions of a cylinder and which form a valve seat, each of said ribs having a planar, inclined flow guiding face and said faces being oppositely inclined; and a flat butterfly valve member mounted for rotation on an axis between and parallel to said facing margins and having side margins complementary to and which close by overlapping said facing margins and open by movement in the direction of said inclined faces, whereby rotation of the valve toward open position produces flow openings of generally triangular cross section and the area of said openings increases in proportion to the angular movement of the valve member.

2. A fluid valve comprising: a hollow body having a valve chamber adapted to be connected to inlet and outlet pipes, said body being surmounted by an annular boss and having an internal circular recess at the bottom of the chamber; a pair of opposed transverse ribs at the sides of said valve chamber, said ribs having concave facing margins which are opposed portions of a cylinder and which form a valve seat, each of said ribs having a planar, inclined flow guiding face and said faces being oppositely inclined; a rotatable valve stem extending through the center of said boss between the ribs, said stem having spaced, circular guide skirts engaging the wall of the boss and of said circular recess and having a handle on its outer end; packing means surrounding the valve stem and filling said boss; and a flat butterfly valve member on said stem, said valve member having parallel side margins complementary to and which close by overlapping said facing margins and open by movement in the direction of said inclined faces, whereby rotation of the valve toward open position produces flow openings of triangular cross section and the area of said openings increases in proportion to the angular movement of the valve member.

3. A fluid valve comprising: a hollow body having a valve chamber adapted to be connected to inlet and outlet pipes; a pair of opposed transverse ribs at the sides of said valve chamber, said ribs having concave facing margins which are opposed portions of a cylinder and which form a valve seat, said ribs extending from top to bottom of the chamber and being oppositely inclined so as to provide oppositely facing, planar, inclined flow guiding faces; and a flat butterfly valve member mounted for oscillatory movement on an axis through the center of said valve chamber, said valve member having parallel sides which are complementary to and close by overlapping the facing margins of said ribs, and open by movement in the direction of said inclined faces, and said valve member having planar top and bottom surfaces in facing relationship to the top and bottom of the valve chamber.

4. A fluid valve comprising: a hollow body having a valve chamber adapted to be connected to inlet and outlet pipes; a pair of ribs at the sides of said valve chamber, each of said ribs having a planar, inclined flow guiding face, and said faces being oppositely inclined, said ribs having concave facing margins which are opposed portions of a cylinder and which form a valve seat; and a butterfly valve member mounted for oscillatory movement in said chamber, said valve member having straight margins with convex faces which are complementary to the concave margins of said ribs, and said valve member having planar faces adjacent said inclined flow guiding faces, whereby the cross section of the openings formed by movement of the margins of the valve member relative to the ribs is generally triangular, and the area of said openings increases in proportion to the angular movement of the valve member.

5. A fluid valve comprising: a hollow body defining a valve chamber adapted to be connected to inlet and outlet pipes; and a butterfly valve member mounted in said chamber for oscillation about an axis between an open and a closed position, opposite sides of said body and of said valve member having mating surfaces which are segments of cylindrical surfaces of revolution about said axis, one of said segments at each side of the chamber having a generally straight margin which is inclined at an acute angle relative to a generally straight margin of the adjacent segment, and said inclined margins being oppositely inclined, whereby, during movement of the valve member toward open position, said relatively inclined straight margins provide flow openings which are generally triangular in cross section and the areas of which increase in proportion to the angular movement of the valve member.

6. The fluid valve of claim 5 in which the valve body is provided with opposed inwardly projecting ribs and the surfaces of revolution are formed in said ribs.

7. A fluid valve comprising: a hollow body defining a valve chamber adapted to be connected to inlet and outlet pipes, said body at opposite sides of the chamber having concave segments of a cylindrical surface of revolution each of which has a generally straight margin and forms a valve seat; and butterfly valve means mounted in said chamber for oscillation on the axis of said cylindrical surface, said valve means at opposite sides having convex segments of a cylindrical surface of revolution each of which has a generally straight margin and fits said valve seats, the straight margin of one of said segments at each side of the chamber being inclined at an acute angle to the plane of the axis and the margin of the adjacent segment, and said inclined margins being oppositely inclined, whereby, during movement of the valve means toward open position, said relatively inclined straight margins produce flow openings at the sides of the chamber which are generally triangular in cross section and the areas of which increase in proportion to the angular movement of the valve means.

8. The fluid valve of claim 7 in which the valve body is provided with opposed inwardly projecting ribs, and the surfaces of revolution are formed in said ribs.

References Cited in the file of this patent

UNITED STATES PATENTS

| | | |
|---|---|---|
| 299,734 | Callahan | June 3, 1884 |
| 714,410 | Stainton | Nov. 25, 1902 |
| 2,174,547 | Bailey | Oct. 3, 1939 |
| 2,577,657 | Houk | Dec. 4, 1951 |